United States Patent
Mott et al.

[15] 3,662,388
[45] May 9, 1972

[54] METHOD AND APPARATUS FOR RECORDING HIGH RANGE RESOLUTION RADAR DATA

[72] Inventors: Murray H. Mott; Donald R. Wehner, both of San Diego; Albert T. Roome, Escondido, all of Calif.

[73] Assignee: The United States of America as represented by the Secretary of the Navy

[22] Filed: July 27, 1970

[21] Appl. No.: 58,384

[52] U.S. Cl. .................343/5 SA, 343/5 PC, 343/17.2 PC
[51] Int. Cl. ..................................................G01s 9/02
[58] Field of Search .................343/5 R, 5 PC, 5 SA, 17.2 PC

[56] References Cited

UNITED STATES PATENTS

| | | | |
|---|---|---|---|
| 2,905,894 | 9/1959 | Rudmann | 343/5 SA X |
| 3,355,734 | 11/1967 | Albanese | 343/5 SA X |

*Primary Examiner*—T. H. Tubbesing
*Attorney*—R. S. Sciascia, George J. Rubens and J. W. McLaren

[57] ABSTRACT

A method and apparatus for recording analog high-range resolution radar target signatures from single airborne targets encompassed within a moving range window on digital magnetic tape formatted for direct analysis by general purpose computers. Target echoes in the form of one-dimensional range profiles of radar backscatter along target length from each of a successive number of transmitted pulses are sampled and recorded at incrementally increasing range positions within a range window until the window has been completely sampled. The apparatus samples each signature at each occurrence of a sampling pulse from a timing unit controlled by a range tracker and holds the obtained sample until the next pulse is provided. Each time a complete range window is sampled, the moving sample-point sampling sequence is repeated and another signature is reconstructed. The sampled output is time-multiplexed with range, azimuth, and elevation data and recorded in digital form on digital magnetic tape which can be utilized in general purpose computers to analyze signature variation with respect to target aspect variation.

3 Claims, 2 Drawing Figures

TIME FROM RADAR TRANSMISSION (RANGE)

INVENTORS
MURRAY H. MOTT
BY DONALD A. WEHNER
ALBERT T. ROOME

George J. Rubens
ATTORNEYS

METHOD AND APPARATUS FOR RECORDING HIGH RANGE RESOLUTION RADAR DATA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Investigations by the Navy have demonstrated the usefulness of high-range resolution radar for classification of certain radar targets. Results from the above investigations have indicated the unique character of signatures of certain classes of targets over a certain range of aspect variation by utilizing high-range resolution radar systems of the type described in "An Experimental High-Resolution Radar for Target Signature Measurements," *IEEE Transactions on Aerospace and Electronic Systems*, Vol. AES-3, No. 6, pp. 249–256, Nov. 1967, by J. N. Maynard and B. F. Summers. In the first phase of the investigations using the 1-foot range resolution radar system described in the above publication, target signatures were recorded on photographic film using conventional photographic techniques. Although the techniques utilized were relatively simple to implement, several inherent disadvantages limited the usefulness of photographic techniques. For example, slow data acquisition rates precluded study and analysis of target signature variation with respect to target aspect. Also conversion of photographic data into a form compatible with general purpose computers was tedious and very inaccurate and unreliable. Finally, it was not possible to use photographic data for real-time signal processing hardware development.

SUMMARY OF THE INVENTION

A method and apparatus for recording analog high-range resolution radar target signatures on digital magnetic tape formatted for direct analysis on general purpose digital computers is disclosed. A high-range resolution radar transmits a linear FM (chirp) signal having a range resolution in the order of 1 foot that makes possible the resolution of echo returns from individual scatterers along the target length so that the resulting target signatures are uniquely related to the geometric configuration of the individual scatterers or scatter centers on the target. Each of a selectively predetermined number of signatures obtained from an equal number of successive radar transmissions is sampled in a moving sample-point mode by means of wide bandwidth sampling apparatus. The apparatus samples each signature at each occurrence of a sampling pulse and holds the sample until the next pulse is provided. Each time a complete range window is sampled, the sampling sequence is repeated such that successive signatures are sampled and reconstructed. The sampling interval is determined by the fidelity required in the signature reconstruction and length of the range window is determined by the length of the largest target expected. The sampled output and range, azimuth, and elevation data are time-multiplexed to an A/D converter that produces a digital output. The digital output is recorded on digital magnetic tape that can be read into a general purpose computer that utilizes the range, azimuth, and elevation data to compute the aspect angle of the target both in azimuth and elevation thereby allowing the study of target signature variation with respect to target aspect.

OBJECTS OF THE INVENTION

It is an object of the present invention to provide a technique and apparatus for recording high-range resolution radar target signature data in a digital form that can be utilized with general purpose computers.

It is another object of the present invention to provide a data conversion technique and apparatus whereby analog high-range resolution data can be studied for real-time variation with respect to target aspect by means of general purpose digital computers.

It is another object of the present invention to provide means for obtaining high-range resolution radar cross-section records of radar targets.

It is another object of this invention to provide means for determining locations of high radar reflectivity on vehicles such as aircraft or ground vehicles.

Other objects, advantages and novel features of the invention will become apparent from the following detailed description of the invention when considered in conjunction with the accompanying drawings wherein:

DESCRIPTION OF THE PREFERRED EMBODIMENT

As discussed previously, the high-resolution radar used to obtain target signatures of the type to be discussed hereinafter essentially comprises a radar of the type described by Maynard and Summers in the previously mentioned publication. The publication describes an S-band radar which transmits a linear FM (chirp) signal having approximately a 600-Mhz bandwidth and a 0.3 microsecond duration.

The resulting time-bandwidth product is 180 and the range resolution is in the order of 1 foot. Other system parameters are described in the publication, however, for the purpose of describing the present inventive concept, the most significant parameter is the 1-foot range resolution.

This resolution makes possible the resolution of echo returns from individual scatterers on radar targets so that target signatures are uniquely related to the geometric configuration of the individual scatterers.

Figure 1:
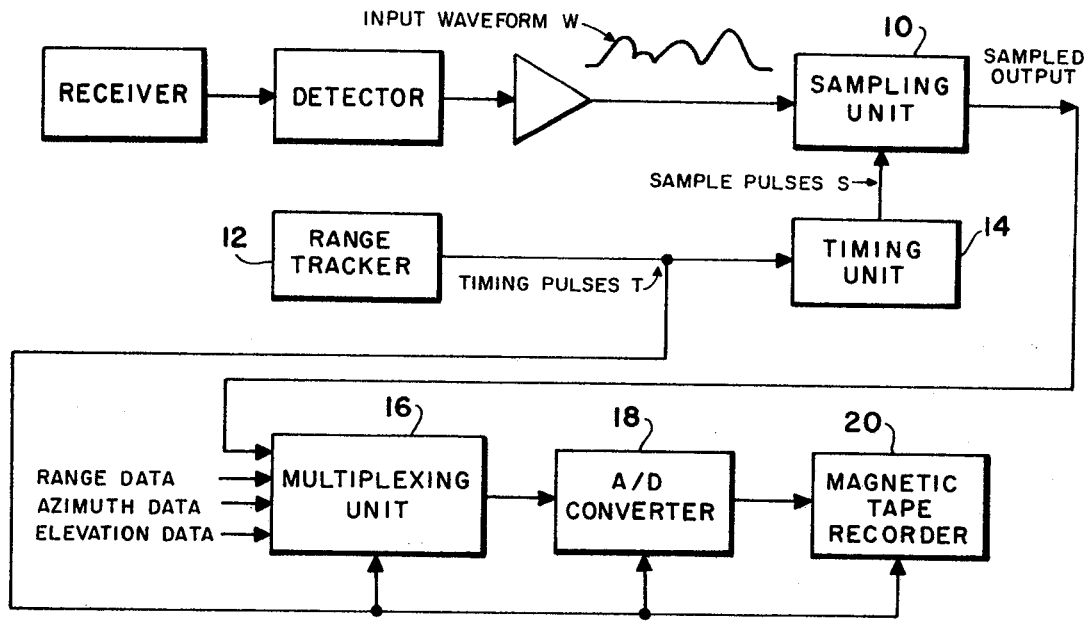
FIG. 1 is a simplified schematic block diagram of a high-range resolution radar target signature sampling and recording system embodying the inventive concept disclosed herein.

FIG. 1 is a simplified schematic block diagram of a radar target signature sampling and recording system embodying the present inventive concept. In the figure, detected high-range resolution radar echoes (returns) from a typical target being illuminated by high-range resolution radar pulses comprise input waveforms W to a high bandwidth sampling unit 10. The unit 10 essentially comprises a sampling oscilloscope which is used for both sampling and visual display purposes.

A range tracker 12 is connected at its output to the input of a timing unit 14. Moving airborne targets are range-tracked by setting and maintaining a range window over a target. The window should encompass the target length, e.g., for a 60-foot target the window width must be at least 120 ns. A pulse with a variable time delay from the transmit signal establishes the start of the range window.

The timing unit 14 is connected at its output to an input of the sampling unit 10. The timing unit 14 provides a selectively predetermined sampling sequence, and the range tracker generates timing pulses at the radar prf which occur at a selectively predetermined fixed time prior to the occurrence of a target signature at the detector output.

Figure 2:
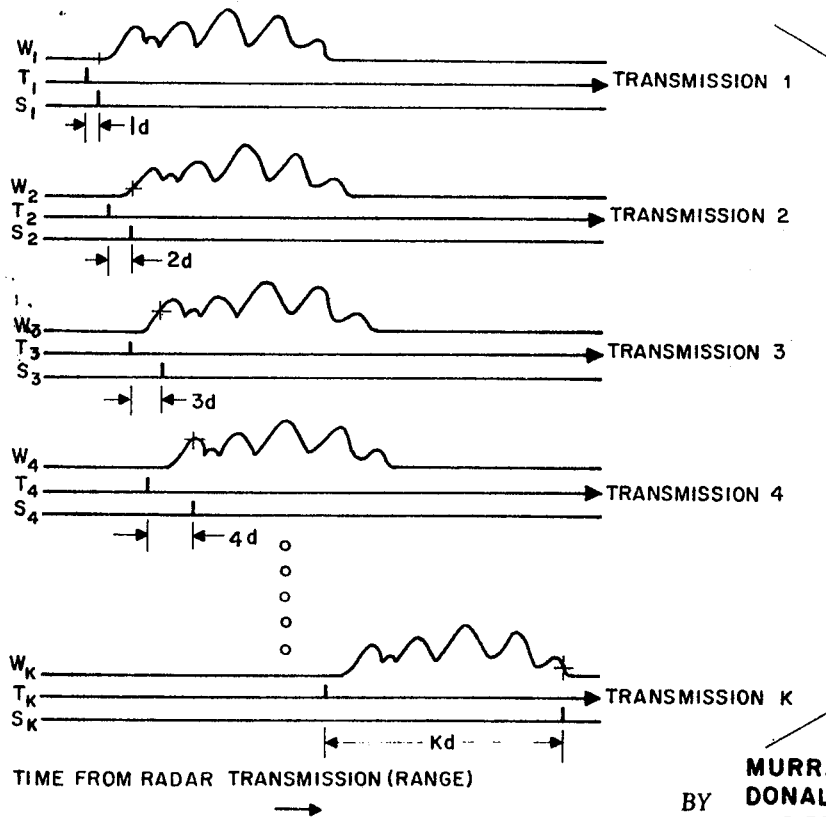
FIG. 2 is a simplified graphical representation of the moving sample-point sampling technique disclosed herein as applied to a number of typical successive target signatures.

It can be appreciated that the timing pulses must therefore be moved continuously in order to maintain the above relationship which is graphically illustrated in FIG. 2 wherein successive signature waveforms with increasing range for a moving target are shown. Signature waveforms $W_1, W_2, W_3, W_4 ... W_k$ are produced by the target in response to the successive high-resolution radar transmissions 1, 2, 3, 4, ... $k$, respectively.

The range tracker 12 produces the timing pulses $T_1, T_2, ... T_k$ shown in FIG. 2 which are coupled to the timing unit 14. The timing unit 14 functions in response to the timing pulses to initiate a moving sample-point mode consisting of a selectively predetermined sequence of sample pulses $S_1, S_2, ... S_k$. It can be seen that the successive sample pulses are delayed by increasing multiples of a selectively predetermined fixed delay D. For example, the sample pulse $S_1$ is delayed an amount equal to D after the occurrence of its corresponding timing pulse $T_1$, and in a similar manner sample pulse $S_k$ is delayed an amount equal to $kD$ after the occurrence of its corresponding timing pulse $T_k$.

The sampling unit 10, which essentially comprises a sampling oscilloscope, samples the input waveform at the occurrence of each sampling pulse and holds the obtained sample until the occurrence of the next sampling pulse. As previously mentioned the unit 10 comprises a wide bandwidth sampling unit. For example, for the radar system parameters described previously, the unit 10 would have a bandwidth in the order of 1 GHz.

When the delay interval reaches $kD$ as shown in FIG. 2 the sequence is repeated and another signature is reconstructed. The width D of the sampling or delay interval is determined by the fidelity desired in the signature reconstruction and the interval length $kD$, or the length of the range window, is determined by the length of the largest target expected to be observed.

The reconstructed signatures, i.e., sampled outputs, are recorded on magnetic tape by means of the recording apparatus of FIG. 1 wherein the sampled outputs, and range, azimuth, and elevation data are coupled to a multiplexing unit 16 which functions to time-multiplex the several inputs to a conventional A/D converter 18.

The output of the A/D converter 18 is recorded in digital form by a conventional tape recorder 20. The recorded magnetic tapes can be read into general purpose computers which utilize the range, azimuth, and elevation data to compute the aspect angle of the target both in azimuth and elevation. Target velocity can also be computed by the computers.

A number of tape characters corresponding to target signatures can be normalized to have a selected peak value that can be recorded on a composite tape that contains discrete sets of signatures obtained from known targets. These composite tapes can facilitate computer analysis of the signatures of a target under surveillance by providing a library of signatures from various targets on a single tape.

Obviously, many modifications of the invention are possible within the scope of the disclosed inventive concept. For example, instead of using a moving-sample-point mode to record target signatures as previously described, a stationary sample-point, high-sampling rate mode can be used to record modulated backscatter from rotating structures on targets such as propellers.

What is claimed is:

1. The method of converting analog high-range resolution radar data from remote targets into digital data compatible with general purpose digital computers comprising the steps of:

illuminating a target under investigation with linear FM pulses of microwave energy having a range resolution of approximately 1 foot;

receiving successive reflected one-dimensional range profiles of microwave energy backscatter along the length of said targets;

said range profiles being unique for each different remote target in accordance with the geometric configuration of the scatter centers on each of said different remote target;

detecting each of said successive reflected range profiles from said target under investigation;

sampling each of the detected successive range profiles at a selectively predetermined rate and at incrementally increasing range positions corresponding to the target length to thereby produce an analog digital output;

converting said analog digital output into a digital output; and recording said digital output on digital magnetic tape.

2. The method of claim 1 further including the steps of time-multiplexing and recording target position information with the recorded digital data whereby the variation of said range profiles with respect to target aspect variation can be computed by said general purpose digital computers.

3. The method of recording on digital magnetic tape high-range resolution radar target signatures comprising the steps of:

illuminating a remote target with an RF pulse having a range resolution of approximately 1 foot;

detecting received target signatures;

sampling in a moving sample-point mode a selectively predetermined number of successive detected target signatures to thereby produce an analog sampled output;

converting said analog sampled output into a digital output; and recording said digital output on digital magnetic tape.

* * * * *